United States Patent [19]

Job et al.

[11] Patent Number: 5,164,352
[45] Date of Patent: Nov. 17, 1992

[54] PROCESS FOR THE PRODUCTION OF ELASTOMERIC, PRIMARILY ISOTACTIC POLYOLEFINS AND CATALYSTS FOR USE IN SAID PROCESS

[75] Inventors: Robert C. Job; Donald F. Haas, both of Houston, Tex.

[73] Assignee: Shell Oil Company, Houston, Tex.

[21] Appl. No.: 841,121

[22] Filed: Feb. 25, 1992

Related U.S. Application Data

[62] Division of Ser. No. 522,001, May 11, 1990, Pat. No. 5,118,768.

[51] Int. Cl.$^5$ ............................................. C08F 4/654
[52] U.S. Cl. .................................. 502/124; 502/123; 526/124
[58] Field of Search .............................. 502/123, 124

[56] References Cited

U.S. PATENT DOCUMENTS

| | | | |
|---|---|---|---|
| 3,112,300 | 11/1963 | Natta et al. | 260/93.7 |
| 3,112,301 | 11/1963 | Natta et al. | 260/93.7 |
| 3,175,999 | 3/1965 | Natta et al. | 260/93.7 |
| 3,240,773 | 3/1966 | Boor | 260/93.7 |
| 3,257,370 | 6/1966 | Natta et al. | 260/93.7 |
| 3,258,455 | 6/1966 | Natta et al. | 260/93.7 |
| 3,305,538 | 2/1967 | Natta et al. | 260/93.7 |
| 3,329,741 | 7/1967 | Schrage et al. | 260/878 |
| 3,335,121 | 8/1967 | Natta et al. | 260/93.7 |
| 3,364,190 | 1/1968 | Emrick | 260/93.7 |
| 3,534,006 | 3/1970 | Kamaishi et al. | 260/80.78 |
| 3,932,307 | 1/1976 | Setterquist | 252/430 |
| 3,950,269 | 4/1976 | Setterquist | 252/430 |
| 3,971,767 | 7/1976 | Setterquist | 526/65 |
| 4,011,383 | 3/1977 | Setterquist | 526/154 |
| 4,017,525 | 4/1977 | Setterquist | 260/429.3 |
| 4,072,809 | 2/1978 | Rogan | 502/124 X |
| 4,136,243 | 1/1979 | Appleyard et al. | 526/139 |
| 4,226,963 | 10/1980 | Giannini et al. | 526/114 |
| 4,255,281 | 3/1981 | Rogan et al. | 502/123 |
| 4,310,439 | 1/1982 | Langer | 502/124 X |
| 4,317,898 | 3/1982 | Karayannis et al. | 502/123 X |
| 4,325,836 | 4/1982 | Epstein et al. | 252/429 B |
| 4,329,253 | 5/1982 | Goodall et al. | 252/429 B |
| 4,335,225 | 6/1982 | Collette et al. | 525/240 |
| 4,336,360 | 6/1982 | Giannini et al. | 526/114 |
| 4,347,160 | 8/1982 | Epstein et al. | 252/429 B |
| 4,353,813 | 10/1982 | Karayannis et al. | 502/124 X |
| 4,393,182 | 7/1983 | Goodall et al. | 526/125 |
| 4,394,291 | 7/1983 | Hawley | 252/429 B |
| 4,442,276 | 4/1984 | Kashiwa et al. | 526/125 |
| 4,487,845 | 12/1984 | Triplett | 502/107 |
| 4,581,342 | 4/1986 | Johnson et al. | 502/119 |
| 4,710,482 | 12/1987 | Job | 502/127 |
| 4,754,006 | 6/1988 | Murata et al. | 526/124 |
| 4,971,936 | 11/1990 | Wilson et al. | 502/124 |
| 5,089,573 | 2/1992 | Job | 502/124 X |

FOREIGN PATENT DOCUMENTS

| | | |
|---|---|---|
| 1146699 | 5/1983 | Canada . |
| 0206753 | 6/1986 | European Pat. Off. . |
| 67-016054 | 2/1967 | Japan . |
| 1486194 | 12/1973 | United Kingdom . |
| 1554340 | 6/1977 | United Kingdom . |

OTHER PUBLICATIONS

Polymer Sequence Determination, James C. Randall, 1977 Macromol. Rev. 2, Syndiotactic Polypropylene, E. A. Youngman and J. Boor, Jr.

Makromol. Chem., Stereochemical Structure and Molecular Weight Distribution of Polypropylenes, Yoshiharu et al.

Thermoplastic Elastomer, C. K. Shih, A. C. L. Su, Hanser Publishers, Munich Vienna New York.

*Primary Examiner*—Patrick P. Garvin
*Attorney, Agent, or Firm*—Donald F. Haas

[57] ABSTRACT

A process for the production of elastomeric, primarily isotactic polyolefins which comprises polymerizing olefins in the presence of a catalyst which comprises the reaction product of a magnesium alkoxide and a tetravalent titanium halide wherein the reaction takes place in the presence of an electron donor which is an effectively hindered heterocyclic aromatic nitrogen compound and an organoaluminum compound.

6 Claims, No Drawings

PROCESS FOR THE PRODUCTION OF ELASTOMERIC, PRIMARILY ISOTACTIC POLYOLEFINS AND CATALYSTS FOR USE IN SAID PROCESS

This is a division of application Ser. No. 522,001, filed May 11, 1990, now U.S. Pat. No. 5,118,768.

BACKGROUND OF THE INVENTION

This invention relates to a process for the production of elastomeric, primarily isotactic polymers and to a catalyst which can be used in such process.

U.S. Pat. No. 4,335,225 discloses a fractionable elastic polypropylene which is said to have an isotactic content of 55% or less and also to contain some syndiotactic and atactic polypropylene. This patent, and its companions on the catalyst system for making this elastic polypropylene, contain much information about elastic-type polypropylene compositions, although the researchers at Montecatini, especially including Giulio Natta, produced some polypropylene compositions which exhibited some of the characteristics of elastomeric compositions. Specifically, U.S. Pat. Nos. 3,175,999; 3,257,370 and 3,258,455 disclose polypropylene compositions which have some elastic-type properties.

Elastomeric polypropylene is different from the "normal" or more well known polypropylenes. These more well known types are crystalline and amorphous polypropylenes. It is normally accepted that crystalline polypropylene generally has the isotactic or syndiotactic structure and that amorphous polypropylene generally has considerable atactic structure. Giulio Natta's U.S. Pat. Nos. 3,112,300 and 3,112,301 describe isotactic polypropylene and give structural formulae for isotactic and syndiotactic polypropylene. The former is a straight chain of propylene units wherein the methyl groups are all aligned on one side of the polymer chain. In the latter, the methyl groups alternate from one side of the chain to the other. In atactic polypropylene, the methyl groups are arranged randomly on the two sides of the chain.

Almost all of the polypropylene which is used commercially is crystalline isotactic polypropylene. These products are well known and have been the subject of many patents and articles. Amorphous polypropylenes, which have very little strength, are used commercially primarily in adhesives and asphalt additives.

SUMMARY OF THE INVENTION

The present invention relates to a catalyst which is useful in the production of elastomeric, primarily isotactic polymers of propylene, 1-butene and other olefins. The catalyst component comprises the reaction product of a magnesium alkoxide compound, which may be of the formula $MgR_1R_2$, where $R_1$ is an alkoxide or aryl oxide group and $R_2$ is an alkoxide or aryl oxide group or halogen, and a tetravalent titanium halide wherein the reaction takes place in the presence of an electron donor which is an effectively hindered heterocyclic aromatic nitrogen compound. The catalyst is completed by an organoaluminum compound.

DETAILED DESCRIPTION OF THE INVENTION

The "normal" well known polypropylenes discussed above are generally high molecular weight materials which consist of blocks of monomer units of relatively or extremely long average isotactic block length (<Liso>), for example, 50 to 200 monomer units. The prior art isotactic polymers (prepared via a $MgCl_2$ supported catalyst) of short average isotactic block length (about 6 to 15 monomer units) normally contain a wide distribution of polymer blocks of varying lengths and are characterized by having relatively low tensile strength and being tacky to the touch.

The polyolefin compositions of the present invention are specifically characterized in that they have a narrow distribution of relatively short block lengths and may be characterized as being of relatively high tensile strength and non-tacky to the touch. By "block lengths" it is meant the number of recurring monomer, in this case olefins such as propylene or 1-butene, which, on the average, occur before there is a defect in the polymer chain. By "defect" it is meant that the symmetry of the recurring units is ended and there may begin a different structure (i.e. a change from isotactic to syndiotactic) or units of another monomer may be placed therein. It is theorized that the average block length, as determined by a numerical integration of the pentads which occur in the $^{13}C$ NMR spectrum, has a great effect on the properties of the polymer. For instance, relatively short average block lengths, i.e. 6 to 15 or even up to 50, tend to occur in a flexible and rubbery polymer which exhibits good elastic properties and is relatively strong (with tensile strengths of about 1000 to 3000 psi). On the other hand, isotactic block lengths of greater than about 50 are characteristic of commercial, very stiff, highly crystalline isotactic polypropylene.

U.S. Pat. No. 4,335,225, discussed above, discloses how to make an elastomeric polypropylene composition which contains up to 55%, and preferably much less, isotactic polypropylene. This polypropylene has an inherent viscosity of 1.5 to 8, a major melting point between 135° and 155° C., exhibits no yield point, has a tensile set not exceeding 150% and contains 10 to 80% by weight of a diethyl ether-soluble fraction which has an inherent viscosity exceeding 1.5 wherein said fraction has an isotactic crystalline content of about 0.5% to about 5% by weight. A special catalyst, which is the subject of several other related patents, is said to be required to make this material. These catalysts are homogeneous zirconium or hafnium catalysts supported upon partially hydrated alumina. Such catalyst systems are difficult to work with, have extremely low productivities (on the order of 1–2% of the productivities of the catalysts of this invention) and are not used commercially to any appreciable extent.

The polyolefins of the present invention are made with a well known type of catalyst for which there is a wealth of commercial experience and knowledge. The catalyst is comprised of the reaction product of a magnesium alkoxide compound, which may be of the formula $MgR_1R_2$, where $R_1$ is an alkoxy or aryl oxide group and $R_2$ is an alkoxide or an aryl oxide group or halogen, and a tetravalent titanium halide wherein the reaction takes place in the presence of an electron donor and, preferably, a halogenated hydrocarbon. Such catalysts are well known and have been used for several years commercially. In the present invention, however, we substitute a new electron donor for those which have been known in the past. In our invention the electron donor is a hindered heterocyclic aromatic nitrogen compound. The catalyst is completed by the addition of organoaluminium compound and, optionally, a selectivity control agent.

The use of such hindered heterocyclic aromatic nitrogen compounds as selectivity control agents in catalyst systems using known electron donors in the procatalyst is the subject of copending application Ser. No. 342,832 filed Apr. 25, 1989, Process for the Production of Elastomeric, Primarily Syndiotactic Polypropylene and Catalyst for use in Said Process by Robert C. Job. In that application, one of the inventors herein discloses and claims the use of such compounds which did not have chloro or methoxy groups as selectivity control agents (SCA) to produce elastomeric, primarily syndiotactic polypropylene. In copending application Ser. No. 484,314, filed Feb. 26, 1990, now U.S. Pat. No. 5,089,573, Process for the Production of Elastomeric, Primarily Isotactic Polyolefins and Catalysts for Use in Said Process, such compounds with chloro or methoxy groups as SCA's made isotactic polyolefins. Both of these applications are herein incorporated by reference. It is therefore surprising that we have found that the use of both groups of compounds as electron donors in the procatalyst produces elastomeric, primarily isotactic polyolefins. It is theorized that these two groups of compounds produce isotactic herein because of the presence of extra chlorine in the procatalyst system.

The electron donors of the present invention are effectively hindered heterocyclic aromatic nitrogen compounds. By "effectively" hindered it is meant that these compounds must be sterically or electronically hindered to a sufficient extent so that they will produce elastomeric, primarily isotactic polyolefins but it is important to note that the electron donors must not be hindered to too great an extent or otherwise such polymers will not be produced.

Generally, sufficient or "effective" hindrance is provided by a constituent group or groups which are attached to the carbon atoms located on either side of the nitrogen compound in the aromatic ring. Methyl groups, as in 2,6-lutidine, and chloro and methoxy groups, as in 2-chloro-6-methoxy pyridine, are of sufficient size to provide effective hindrance but are not too big so that the advantages of the present invention are not achieved. For instance, we have found that, generally, neither hydrogen atoms, as in pyridine, nor benzo groups, as in acridine, are bulky enough to provide effective hindrance (although benzo groups in combination with methyl groups, as in quinaldine, provide appropriate hindrance). Likewise, if the substituent group is too bulky, the electron donor will not undergo efficient binding to the catalytic system and thus will not provide appropriate stereochemical control.

Compounds which may be used as electron donors include 2,3-dimethylquinoxaline, quinaldine, 2,6-lutidine, 2,4,6-collidine, tetramethylpyrazine, 2,4-dimethylquinoline, 2,6-dichloropyridine, 2-chloroquinoline, 2-chloro-6-methoxypyridine, 2,3-dichloroquinoxaline, 2,4,6-trichloropyrimidine, 2,4,5,6-tetra-chloropyrimidine, 2-chlorolepidine and 6-chloro-2-picoline.

Examples of halogen containing magnesium compounds that can be used as starting materials for the halogenating reaction are alkoxy and aryloxy magnesium halides, such as isbutoxy magnesium chloride, ethoxy magnesium bromide, phenoxy magnesium iodide, cumyloxy magnesium bromide and naphthenoxy magnesium chloride.

Preferred magnesium compounds to be halogenated are selected from magnesium dialkoxides and magnesium diaryloxides. In such compounds the alkoxide groups suitable have from 1 to 8 carbon atoms. Examples of these preferred groups of compounds are magnesium di-isopropoxide, magnesium diethoxide, magnesium dibutoxide, magnesium diphenoxide, magnesium dinaphthenoxide and ethoxy magnesium isobutoxide. Magnesium alkoxides disclosed in U.S. Pat. No. 4,710,482, issued Dec. 1, 1987 to Robert C. Job, are also preferred for use herein. Especially preferred is $Mg_4(OCH_3)_6(CH_3OH)_n X_2$ where X is resorcinol or a substituted resorcinol monoanion and n is a number up to 10.

Magnesium compounds comprising one alkyl group and one alkoxide or aryloxide group can be employed, as well as compounds comprising one aryl group and one alkoxide or aryloxide group. Examples of such compounds are phenyl magnesium phenoxide, ethyl magnesium butoxide, ethyl magnesium phenoxide and naphthyl magnesium isoamyloxide.

In the halogenation with a halide of tetravalent titanium, the magnesium compounds are preferably reacted to form a magnesium halide in which the atomic ratio of halogen to magnesium is at least 1.2. Better results are obtained when the halogenation proceeds more completely, i.e. yielding magnesium halides in which the atomic ratio of halogen to magnesium is at least 1.5. Except in cases where phenoxides (e.g. resorcinol) are used, the most preferred reactions are those leading to fully halogenated reaction products. Such halogenation reactions are suitably effected by employing a molar ratio of magnesium compound to titanium compound of 0.005:1 to 2:1, preferably 0.01:1 to 1:1. These halogenation reactions are conducted in the additional presence of the electron donor. An inert hydrocarbon or halohydrocarbon diluent or solvent may be used as a partial substitute for the titanium compound.

Suitable halides of tetravalent titanium include aryloxy- or alkoxy-di and -trihalides, such as dihexanoxy-titanium dichloride, diethoxytitanium dibromide, isopropoxy-titanium tri-iodide and phenoxy-titanium trichloride. Titanium tetrahalides are preferred. Most preferred is titanium tetrachloride.

Suitable halohydrocarbons are compounds such as butyl chloride, amyl chloride and the following more preferred compounds. Preferred aliphatic halohydrocarbons are halogen-substituted hydrocarbons with 1 to 12, particularly less than 9, carbon atoms per molecule, comprising at least two halogen atoms, such as dibromomethane, trichloromethane, 1,2-dichloroethane, dichlorobutane, 1,1,1-trichloroethane, trichlorocyclohexane, dichlorofluoroethane, trichloropropane, trichlorofluorooctane, dibromodifluorodecane, hexachloroethane and tetrachloroisooctane. Carbon tetrachloride and 1,1,1-trichloroethane are preferred aliphatic halohydrocarbons. Aromatic halohydrocarbons may also be employed, e.g., chlorobenzene, bromobenzene, dichlorobenzene, dichlorodibromobenzene, naphthyl chloride, chlorotoluene, dichlorotoluenes, and the like; chlorobenzene and dichlorobenzene are preferred aromatic halohydrocarbons. Chlorobenzene is the most preferred halohydrocarbon.

The halogenation normally proceeds under formation of a solid reaction product which may be isolated from the liquid reaction medium by filtration, decantation or another suitable method. It may be subsequently washed with an inert hydrocarbon diluent, such as n-hexane, isooctane or toluene, to remove any unreacted material, including physically adsorbed halohydrocarbon.

The product is also contacted with a tetravalent titanium compound such as a dialkoxy-titanium dihalide, alkoxy-titanium trihalide, phenoxy-titanium trihalide or titanium tetrahalide. The most preferred titanium compounds are titanium tetrahalides and especially titanium tetrachloride. This treatment increases the content of titanium tetrachloride in the solid catalyst component. This increase should preferably be sufficient to achieve a final chlorine atomic ratio of greater than 90% of the ionic equivalents of magnesium plus titanium present in the solid catalyst component. To this purpose the contacting with the tetravalent titanium compound is most suitably carried out at a temperature of from 60° to 136° C. during 0.1–6 hours, optionally in the presence of an inert hydrocarbon diluent. Particularly preferred contacting temperatures are from 70° to 120° C. and the most preferred contacting periods are in between 0.5 to 3.5 hours. The treatment may be carried out in successive contacts of the solid with separate portions of TiCl$_4$.

After the treatment with tetravalent titanium compound the catalyst component is suitably isolated from the liquid reaction medium and washed to removed unreacted titanium compound. The titanium content of the final, washed catalyst constituent is suitably between about 1.5 to 3.6 percent by weight or up to about 4.5 percent. The preferred halogen atom, possibly contained in the magnesium compound to be halogenated, and contained in the titanium compound which serves as halogenating agent and in the tetravalent titanium compound with which the halogenated product is contacted, is chlorine.

The material used to wash the catalyst component is an inert, light hydrocarbon liquid. Preferred light hydrocarbon liquids are aliphatic, alicyclic and aromatic hydrocarbons. Examples of such liquids include isopentane, n-hexane, iso-octane and toluene, with iso-pentane being most preferred. The amount of light hydrocarbon liquid employed is 5 to 100 cc/gm of procatalyst in each of 2 to 6 separate washes, preferably about 25 cc/gm. The resulting solid component is the procatalyst, which is used with cocatalyst in the polymerization process.

The primary organoaluminum compound to be employed as cocatalyst may be chosen from any of the known activators in olefin polymerization catalyst systems comprising a titanium halide but is most suitably free of halogens. While aluminum trialkyl compounds, dialkylaluminum halides and dialkylaluminum alkoxides may be used, aluminumtrialkyl compounds are preferred, particularly those wherein each of the alkyl groups has 1 to 6 carbon atoms, e.g., aluminumtrimethyl, aluminumtriethyl, aluminumtri-n-propyl, aluminumtri-isobutyl, aluminumtri-isopropyl and aluminumdibutyl-n-amyl. Alternatively, these may be used in combination with various alkyl aluminum halides, e.g. diethyl aluminum chloride.

If desired, a selectivity control agent may be used with the catalyst of the present invention. The very same effectively hindered heterocyclic aromatic nitrogen compounds which are used as the electron donors in the present invention should be used as selectivity control agents as well. Preferred proportions of selectivity control agent, employed separately, in combination with, or reacted with an organoaluminum compound, calculated as mol per mol titanium compound, are in the range from 1 to 100 particularly from 10 to 80.

To prepare the final polymerization catalyst composition, procatalyst, cocatalyst and, optionally, the selectivity control agent may be simply combined, most suitably employing a molar ratio to produce in the final catalyst an atomic ratio of aluminum to titanium of from 1 to 150, and suitably from about 10 to about 150. Increasing the Al:Ti ratio tends to slightly increase catalyst activity at the expense of increased catalyst residue in the unextracted product. These factors will be considered in selecting the Al:Ti ratio for any given process and desired product. In general, Al:Ti ratios in the range of 30:1 to 100:1 and especially of about 50:1 to 80:1 will be found advantageous.

Polymerization of propylene, for example, may be conducted with the catalysts of the invention in a liquid system with an inert diluent such as a paraffinic liquid of 3 to 15 carbon atoms per molecule, or in a liquid system containing propylene as sole diluent or together with a small amount of propane, or in vapor phase. Propylene polymerization in liquid phase is conducted at a temperature of 50° to 80° C. and at a pressure sufficient to maintain liquid conditions. In a continuous reaction system, the liquid in the reaction zone is maintained at reaction conditions, monomer is continuously charged to the reaction zone, catalyst components are also charged continuously or at frequent intervals to the reaction zone, and reaction mixture containing polymer is withdrawn from the reaction zone continuously or at frequent intervals.

In propylene polymerization, the reaction mixture is typically maintained at conditions at which the polymer is produced as a slurry in the reaction mixture. The catalyst systems of this invention are highly active and specific in propylene polymerization so that no removal of atactic polymer from the polymer product is required.

While the catalysts of this invention are particularly adapted for use in continuous polymerization systems, they may, of course, also be employed in batch polymerization. This may be of advantage in a multi-stage polymerization in which propylene polymers and propylene-ethylene polymers are produced in separate reaction zones arranged in sequence.

It is well known that supported coordination procatalysts and catalyst systems of the type used herein are highly sensitive, in varying degrees, to catalyst poisons such as moisture, oxygen, carbon oxides, polyolefins, acetylenic compounds and sulfur compounds. It will be understood that in the practice of this invention, as well as in the following examples, both the equipment and the reagents and diluents are carefully dried and free of potential catalyst poisons.

The productivity of the procatalyst is determined as kg polymer/g procatalyst in a standard one hour batch reaction; it may also be expressed as kg polymer/g Ti. Catalyst activity is sometimes reported as kg polymer/g procatalyst or Ti/hr.

The specificity towards production of isotactic polymer and towards average block length is determined by measurements involving the pentads observed in the $^{13}$C NMR spectrum (See "Polymer Sequence Determination, Carbon-13 NMR Method" by James C. Randall, Academic Press, New York 1977). A relationship has been determined such that the average block length may be estimated by measuring the amount of xylene soluble polymer (XS) in accordance with regulations of the U.S. Food and Drug Administration. The XS test is carried out as follows: The sample is completely dissolved in xylene in a stirred flask by boiling. The flask is then immersed in a 25° C. water bath without stirring for one hour, during which the insoluble portion precipitates. The precipitate is filtered off and the solubles present in the filtrate are determined by evaporating a 20 ml aliquot of the filtrate, drying the residue under vacuum and weighing the residue. The xylene-solubles increase for short block length material and may include some amorphous and low molecular weight crystalline material. (FDA regulations 121.2501 and 121.2510, 1971). The desirable numerical value of XS for the propylene homopolymers of this invention is typically between about 35% and about 85%.

PREPARATION OF MAGNESIUM PRECURSOR

Magnesium methoxide (12% in methanol, stabilized with 0.125 eq of tetramethoxysilane) was added to 0.5 eq of 2-methyl-resorcinol (10% in methanol) to produce a crystalline precipitate. After washing with isooctane and drying under a stream of moving nitrogen, the crystals were suspended in chlorobenzene and boiled until the solvent volume had decreased by about 10%. The solids were collected by filtration, washed with isooctane and dried under moving nitrogen.

PROCATALYST PREPARATION

86: The chlorobenzene boiled solids from above (2.53 g) were slurried in 60 ml of 50/50 (vol/vol) TiCl$_4$/chlorobenzene with 0.31 ml (2.6 mmol) of 2,6-lutidine. After stirring for 1 hour at 115° C., the solids were collected by filtration and then slurried in another 60 ml of 50/50 solvent mixture, along with 0.31 ml of 2,6-lutidine, and stirred for 30 minutes at 115° C. The solids were collected then washed with 125 ml of isooctane at 90° C. and twice with isooctane at room temperature and then dried under moving nitrogen at ambient temperature. Yield 2.3 g.

123: The procedure was identical except that 0.42 ml (3.5 mmol) of 2,6-lutidine was used. Yield 3.1 g.

87: The procedure was identical except that 0.36 ml (2.7 mmol) of quinaldine was used instead of 2,6-lutidine. Yield 2.9 g.

92: Procatalyst 86 was suspended in 60 ml of 50/50 (vol/vol) TiCl$_4$/chlorobenzene and stirred for 30 minutes at 115° C., then washed once with issoctane at 90° C., twice with isooctane at room temperature and dried under moving nitrogen.

93: The same hot solvent wash (as for 92) was carried out on procatalyst 87.

127: The same hot solvent wash (as for 92) was carried out on procatalyst 123.

The compositional results and preparation summary for each procatalyst are presented in Table 1.

POLYMERIZATION

Polymerizations were carried out in rapidly stirred liquid propylene in a 1-gallon stainless steel autoclave. Procatalysts were used as 5% mineral oil slurries. Triethylaluminum (TEA) was used as a 0.28M solution in isooctane. Sufficient procatalyst slurry to prepare 100 to 300 g of polymer was mixed with TEA and optional selectivity control agent (2,6-lutidine) and allowed to stand, at room temperature, for 20 minutes before injection into the autoclave at reaction temperature. The polymerizations were terminated by venting the propylene away. Polymerization in 1-butene was carried out in the same manner except that only 1.8 l of monomer was used. The polymer lumps were cut into pieces then dried at 80° C., in an oven under aspirator vacuum, for about 3 hours before characterization. The reaction conditions, cocatalyst ratios, productivities and polymer melt flow and solubles content are reported in Table 2.

TENSILE PROPERTIES

In order to prepare samples for tensile measurements, about 60 g of the polymer was blended in a Brabender mixer at 190° C. with 0.3 g of Irganox 1010 antioxidant. After cooling, a 6"×6"×2 mm plate was compression molded at 400° F. under 5 tons pressure. Tensile bars were then cut from the plate using a 'D' die. The measurement conditions are as described in ASTM D 412-83. Tensile set is the residual elongation imparted to a sample after stretching to 4 times its original length at a rate of 20"/minute and then allowing it to recover to zero load at that same rate. Tensile yield is the plateau where no increase in stress is required to cause further elongation of the sample. Tensile at break is the stress required to break the sample at an elongation rate of 20"/minute. Elongation at break is the measured elongation at the break condition. Tensile properties, for the polymers prepared in this study, are reported in Table 3.

$^{13}$C MAGNETIC RESONANCE

Spectra were obtained at 135° C. on samples dissolved in 1,2,4-trichlorobenzene. The spectrum reference was the mmmm methyl group assigned at 21.68 ppm. The isotactic pentads (mmmm) were clearly the dominant feature of each spectrum. The calculated results of % syndiotactic, % isotactic, % defective and the respective average block lengths, for the polymers prepared in this study, are shown in Table 4.

TABLE 1

| | | | Procatalysts | | | |
|---|---|---|---|---|---|---|
| Catalyst Number | Electron Donor | | Conditions | % Mg | % Cl | % Ti |
| | Type | mmol/l | | | | |
| 86 | 2,6-L | 44 | ED added + wash, 115° C. | 15.5 | 64.8 | 4.19 |
| 123 | 2,6-L | 60 | ED added + wash, 115° C. | 13.5 | 63.1 | 6.31 |
| 87 | Quinal | 44 | ED added + wash, 115° C. | 12.4 | 59.8 | 6.43 |
| 92 | 2,6-L | — | Wash 86 in TiCl$_4$/CB | 16.2 | 67.0 | 3.24 |
| 127 | 2,6-L | — | Wash 123 in TiCl$_4$/CB | 17.7 | 66.8 | 4.52 |
| 93 | Quinal | — | Wash 87 in TiCl$_4$/CB | 14.3 | 64.1 | 4.91 |

2,6-L = 2,6-lutidine
CB = chlorobenzene
Quinal = quinaldine
ED = electron donor

TABLE 2

Autoclave Runs Utilizing Procatalysts from Table 1

| Run No. | Ti (umol) | TEA/SCA/Ti (mol/mol/mol) | Temp (°C.) | Time (hr) | Yield (Kg/g cat) | X.S. (% wt) | M.F. (dg/min) |
|---|---|---|---|---|---|---|---|
| Catalyst 86: | | | | | | | |
| N-538 | 33 | 56/17/1 | 18 | 4.0 | 3.3 | 56.4 | 0.027 |
| N-531 | 12 | 56/17/1 | 60 | 3.2 | 10.9 | 62.2 | 0.11 |
| N-537 | 12 | 56/17/1 | 80 | 1.5 | 4.9 | 69.3 | 0.31 |
| M-483 | 33 | 42/0/1 | 18 | 4.0 | 3.9 | 66.0 | 0.16 |
| M-480 | 25 | 56/0/1 | 60 | 1.5 | 15.4 | 58.0 | 0.30 |
| M-484 | 12 | 56/0/1 | 80 | 1.5 | 17.9 | 62.6 | 0.74 |
| M-491 | butene | 100/10/1 | 60 | 1.5 | 2.5 | — | — |
| Catalyst 123: | | | | | | | |
| M-507 | 19 | 56/0/1* | 67 | 1.0 | 9.8 | 57.1 | 32 mmol $H_2$ |
| Catalyst 87: | 0 10 | | | | | | |
| N-536 | 51 | 27/2.5/1 | 18 | 4.0 | 2.4 | 63.4 | 0.10 |
| M-478 | 19 | 37/10/1 | 60 | 1.5 | 6.1 | 64.8 | 0.14 |
| N-533 | 38 | 18/0/1 | 60 | 1.5 | 15.5 | 61.5 | 0.40 |
| Catalyst 92: | | | | | | | |
| N-545 | 19 | 72/10/1 | 60 | 1.5 | 5.1 | 61.2 | — |
| N-543 | 10 | 70/0/1 | 60 | 1.8 | 12.2 | 64.6 | 0.32 |
| Catalyst 93: | | | | | | | |
| M-4S9 | 15 | 48/0/1 | 60 | 1.5 | 13.3 | 60.0 | 0.68 |
| Comparative Example:** | | | | | | | |
| M-375 | 10 | 70/20/1 | 60 | 1.5 | 15.0 | 67.6 | 0.11 |

*32 mmol $H_2$ was added to the autoclave.
**2,6-lutidine as SCA with a procatalyst containing isobutyl-phthalate as internal electron donor.

TABLE 3

Tensile Properties for Most of the Polymers Produced Above

| Run No | SCA | Tensile set (%) | Tensile yield (psi) | Tensile at break (psi) | Elongation at break (%) |
|---|---|---|---|---|---|
| Catalyst 86: | | | | | |
| N-538 | 2,6-L | 87 | 756 | 2110 | 892 |
| N-531 | 2,6-L | 117 | 897 | 2182 | 826 |
| N-537 | 2,6-L | 103 | 742 | 1455 | 885 |
| M-480 | no SCA | 126 | 1094 | 2132 | 877 |
| M-484 | no SCA | 144 | 819 | 1456 | 891 |
| M-491 | polybutene | 143 | 305 | 1546 | 457 |
| Catalyst 123: | | | | | |
| M-507 | no SCA, $H_2$ | 235 | 1463 | 1866 | 730 |
| Catalyst 87: | | | | | |
| N-536 | 2,6-L | 75 | 740 | 2463 | 831 |
| M-478 | 2,6-L | 126 | 997 | 2327 | 876 |
| N-533 | no SCA | 126 | 901 | 2001 | 892 |
| Catalyst 92: | | | | | |
| N-545 | 2,6-L | 113 | 934 | 2184 | 886 |
| N-543 | no SCA | 113 | 824 | 1760 | 890 |
| Catalyst 93: | | | | | |
| M-489 | no SCA | 130 | 826 | 2182 | 954 |
| Comparative Example: | | | | | |
| M-375 | 2,6-L | 65 | 730 | 1554 | 750 |

TABLE 4

$^{13}$C Magnetic Resonance Results for Polymers Produced Above

| Run Number | SCA | Isotactic (mol %) | Liso (units) | Syndiotactic (mol %) | Lsyndio (units) | Defective (mol %) |
|---|---|---|---|---|---|---|
| Catalyst 86: | | | | | | |
| N-538 | 2,6-L | 42 | 11 | 36 | 7.4 | 21 |
| N-531 | 2,6-L | 45 | 13 | 35 | 7.6 | 20 |
| N-537 | 2,6-L | 46 | 12 | 32 | 7.0 | 22 |
| M-483 | no SCA | 46 | 11 | 31 | 6.5 | 23 |
| M-484 | no SCA | 51 | 12 | 27 | 6.5 | 22 |
| M-491 | polybutene | 57 | 16 | 19 | 6.1 | 24 |
| Catalyst 87: | | | | | | |
| N-536 | 2,6-L | 45 | 11 | 33 | 6.9 | 22 |
| M-478 | 2,6-L | 49 | 13 | 31 | 7.1 | 20 |
| N-533 | no SCA | 53 | 13 | 27 | 6.6 | 20 |
| Catalyst 92: | | | | | | |
| N-545 | 2,6-L | 45 | 13 | 35 | 7.6 | 22 |
| N-543 | no SCA | 49 | 12 | 30 | 7.2 | 21 |
| Catalyst 93: | 22. | | | | | |
| M-489 | no SCA | 52 | 13 | 26 | 6.6 | 22 |
| Comparative Example: | | | | | | |
| M-375 | | 25 | 10 | 54.5 | 8.7 | 20.5 |

It can be seen that all of the polymers made according to the process and with the catalyst of the present invention are primarily isotactic in nature (Table 4). Furthermore, it can be seen that there appears to be no appreciable difference between polymers made with 2,6-lutidine as a selectivity control agent and those made without any selectivity control agent in terms of both isotacticity and the tensile properties (see Table 3).

All of the polymers produced according to the present invention have tensile properties which are indicative of the elastomeric nature of the polymers. All of the polymers exhibited a short average block length (11–13 except for polybutene which was 16).

A comparative example was performed. The procatalyst used was prepared in a manner identical to catalyst #86, 87 and 123 except that isobutylphthalate was used as the electron donor. The polymerization was carried out as described above with triethylaluminum as cocatalyst and 2,6-lutidine as the selectivity control agent. This catalyst was one of those described in the above-mentioned previous application Ser. No. 342,832. The polymer produced with this catalyst contained 54.5 percent syndiotactic material and only 25% isotactic material. Thus, predominantly syndiotactic polymer is produced when the effectively hindered nitrogen heterocycle is used as an SCA whereas predominantly isotactic polymer is produced when that heterocycle is utilized as an internal electron donor.

We claim:

1. A catalyst for use in the polymerization of elastomeric primarily isotactic polyolefins which comprises:
   (a) The reaction product of a magnesium alkoxide and a tetravalent titanium halide wherein the reaction takes place in the presence of an electron donor which is selected from the group consisting of 2,3-dimethylquinoxaline, quinaldine, 2,6-lutidine, 2,4,6-collidine, tetramethylpyrazine, 2,4-dimethylquinoline, 2,6-dichloropyridine, 2-chloroquinoline, 2-chloro-6-methoxypyridine, 2,3-dichloroquinoxaline, 2,4,6-trichloropyrimidine, 2,4,5,6-tetra-chloropyrimidine, 2,chlorolepidine and 6-chloro-2-picoline, and
   (b) An organoaluminum compound.

2. The catalyst of claim 1 wherein the tetravalent titanium halide is titanium tetrachloride.

3. The catalyst of claim 2 wherein the magnesium alkoxide is a compound of the formula $MgR_1R_2$, where $R_1$ is an alkoxide or aryl oxide group and $R_2$ is an alkoxide or aryloxide or halogen.

4. The catalyst of claim 3 wherein both $R_1$ and our $R_2$ are ethoxide.

5. The catalyst of claim 1 wherein the magnesium alkoxide is a magnesium compound of the formula $[Mg_4(OR_3)_6(R_4OH)_{10}]X$ where X is a couterion or ions having a total charge of $-2$ and $R_3$ and $R_4$, which may be the same or different, are selected from alkyl groups of 1 to 4 carbon atoms.

6. The catalyst of claim 5 wherein $R_3$ and $R_4$ are methyl groups and X is resorcinol.

* * * * *